Feb. 20, 1968    GORDON P. K. CHU ET AL    3,369,390
APPARATUS FOR TESTING STRAIN
Filed Oct. 19, 1964    8 Sheets-Sheet 1

FIG. 1

INVENTORS
Gordon P. K. Chu
Naohiro Soga
BY
Eli Weiss
ATTORNEY

United States Patent Office 3,369,390
Patented Feb. 20, 1968

3,369,390
APPARATUS FOR TESTING STRAIN
Gordon P. K. Chu, New Brunswick, N.J., and Naohiro Soga, Pearl River, N.Y., assignors to American Radiator & Standard Sanitary Corporation, New York, N.Y., a corporation of Delaware
Filed Oct. 19, 1964, Ser. No. 404,610
4 Claims. (Cl. 73—15.6)

ABSTRACT OF THE DISCLOSURE

The present invention provides an apparatus for measuring the stress-strain in a ceramic-metal system which comprises in combination a furnace, a mounting post therein from which a ceramic-metal specimen is suspended within the furnace, an extension rod attached to the free end of the suspended specimen and extending axially therefrom to the outside of the furnace. Attached to the outside end of the rod is a magnetic core, extending therefrom at a right angle and interacting with a linear displacement transformer whereby the displacement of the rod is measured. In addition thereto means are provided for recording the measurement of the displacement, means for measuring and recording the temperature of the specimen and also means for controlling the temperature of the furnace.

---

This invention relates to an apparatus for determining the stress-strain developed in a ceramic-metal system, such as a glass-metal system, and more particularly, it relates to an apparatus for determining the exact amount of displacement resulting from the stress-strain induced by heating such system.

The stress-strain problem in ceramic-metal systems is of prime importance in enameling practice because many enameling troubles, such as crazing, spalling and chipping, are considered to be closely associated with the presence of stress caused by design or processing variables. This stress-strain problem, therefore, has long been the subject of investigations. At first, the stress developed in the ceramic-metal system was calculated from the coefficient of thermal expansion of glass and metal. The actual stress, however, could not be estimated with accuracy from the thermal expansion of ceramic and metal because its magnitude is changed by altering the mechanical or thermal history of the specimen.

Several attempts have been made to determine the actual stress produced in the ceramic-metal system. The permanent deformation of enameled iron strips has been measured to observe the relative strain and stress between the enamel and iron; and the deflection of an enameled metal ring has been measured and compared with the thermal expansion of enamel and metal.

The stress calculation was based on the bimetallic relationship and on the observed deflection at room temperature. In subsequent work, the measurement was carried out not only at room temperature but also at elevated temperatures because more information could be obtained by measuring the relative amount of stress at any given temperature. A special apparatus which would record the stress and temperature simultaneously in a ceramic-metal system has also been developed. The enameled metal strip was suspended vertically in a furnace and the deflection of the enameled specimens, resulting from temperature change, was sensed through a photoelectric device. Both the deflection and temperature were recorded on a function plotter. This apparatus was used for the investigation of the relationship between the thickness of the ceramic coating and the stress developed. The stress in enameled cast iron from room temperature to the softening point of the enamel using a similar method has been measured.

However, the older methods are either very time consuming or less accurate and not readily adaptable for rapid determinations of the stress-strain of ceramic-metal systems.

In accordance with this invention there is provided an apparatus which will measure the stress-strain induced in a ceramic-metal system by heating said system, and will yield information which will enable one to detect and determine sensitivity either the minor variations of the material composition or changes in the processing history of the system. The extreme sensitivity of the new device could even show the difference by using different atmospheres in the heating furnace. The invention further provides an apparatus by which the measurements of the stress-strain can be carried out in a fully automatic time saving operation.

The apparatus of this invention comprises the features of construction, combinations of elements, and arrangements of parts which are exemplified in the constructions as set forth in the drawings.

In order to measure the deflection of the enameled specimen, one end of the specimen strip was fixed rigidly and the other end was left free to move. The rigid mounting was accomplished by firmly fastening one end of the strip to the tip of the mounting post, which was made of a high temperature low expansion alloy, such as an iron-nickel alloy rod (Invar, ¼-inch diameter). A thin rod of a high temperature low expansion alloy, preferably Invar, ¹⁄₁₆-inch diameter, was attached to the other end of the sample strip in order to amplify the deflection, which occurred in the furnace, thereby making the deflection easily observable and recordable outside the furnace. The specimen was held preferably horizontally in the furnace. The influence of the gravity of the thin rod and attachments thereto on the deflection of the specimen was kept to a minimum in such an arrangement. The heating elements were built from an Alundum tube 1½ inches in diameter and 10 inches in length, wound with 6 feet Nichrome wire (B and S 22 gauge with a total resistance of 6.1 ohms). The furnace of rectangular shape was 4 inches wide, 12 inches long and 5 inches high. A stepless program controller (West, Model JSG) was installed for regulating the furnace.

Several means are suitable for sensing deflection of the specimen: a photo-electric device with a photocell, an optical displacement follower, a pressure-type transducer (like strain gauges), a comparator gauge (such as a tolerator and a micromanipulator), or a linear displacement transformer. Preferably, a linear displacement transformer, an electro-mechanical transducer which produces a voltage output directly proportional to the displacement of a center magnetic core was used. The magnetic armature core was fixed to the free end of the glass rod and axially positioned inside the three transformer coil assembly, consisting of a primary with secondaries connected in opposing series. By energizing the primary with alternating current, a voltage output appears across the secondary circuit when the magnetic core is moved from the null position. Preferably, an insulating block was placed between the specimen and the armature core. This insulating block has an opening through which the extension rod passes.

The thermal deflection was sensed by a linear displacement transformer (Model 575DT-250), Sanborne Company. By changing the magnetic armature core, this device could transduce linear displacements into proportional voltage outputs with a linearity to 0.5% over a range of 0.200″, and by choosing another proper linear displacement transformer, it is possible to extend this range from ±0.200″ to ±0.500″. The deflection of the specimen and its temperature, which was measured by an attached Chromel-Alumel thermocouple, were directly recorded on a function plotter (Honeywell), Electronik X-Y. Thus, the displacement of the core, fixed on the end of a thin rod, changes voltage output; its magnitude depends on the position of the cores relative to the coil assembly.

The applicability of the apparatus is illustrated in the results which follow:

Two kinds of frits having different coefficients of thermal expansion were chosen as the enamel frits for the ground coat. Their compositions (in mole percent) are shown in Table I.

TABLE I.—FRIT COMPOSITION

| | Na₂O | Al₂O₃ | B₂O₃ | CaO | SiO₂ | CaF₂ | CoO | NiO |
|---|---|---|---|---|---|---|---|---|
| G-101 | 20 | 5 | 15 | | 55 | 5 | 0.6 | 0.5 |
| G-102 | 20 | 5 | 10 | 5 | 55 | 5 | 0.6 | 0.5 |

It is well-known in glass technology that the additions of CaO to the glass causes an increase in the value of both the coefficient of thermal expansion and the modulus of elasticity.

The frits were melted in a clay crucible (7¼ in. height, 5 in. O.D. top, Denver Fire Clay) in a gas furnace at 1250° C. for 3 hours and poured into water. After being dried and ground into powder the frit was milled with 7% clay, ¼% borax, and 1/10% bentonite to make the ground coat enamel slip.

The steel samples were cut into 1 by 4 inch strips from a 60-mil thick enameling steel sheet. After sandblastings, the steel strip was weighed to the nearest 0.01 gm., and sprayed with the enamel slip on one side only up to ½ inch from each end. The strip was reweighed after drying and from the weight increases, the application weight of ground coat was determined in grams per square foot (dry weight). The specimens were fired in a hanging position at about 900° C. for 3.5 minutes and air cooled. The thickness of the coating was calculated from the density of the frit (2.58 g./cc. for G-101 frit and 2.59 g./cc. for G-102 frit). These values are shown in Table II. They are very close to the actual measured thickness.

TABLE II.—SPECIMEN ENAMEL THICKNESS

| Sample No. | Enamel Application Weight (gm./sq. ft.) | Enamel Thickness Calculated from density, mil. |
|---|---|---|
| G-101-1 | 12.7 | 2.2 |
| G-101-2 | 24.0 | 4.2 |
| G-101-3 | 44.5 | 7.7 |
| G-102-1 | 14.8 | 2.5 |
| G-102-2 | 33.0 | 5.7 |
| G-102-3 | 54.3 | 9.3 |

Figure 1:
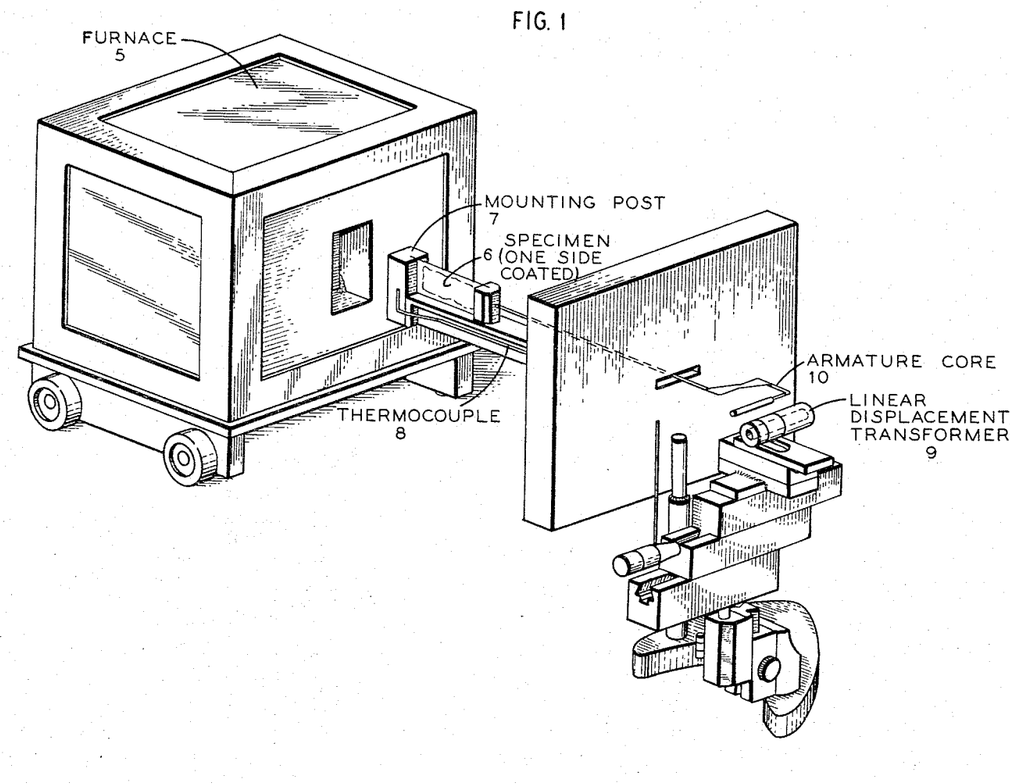
FIG. 1 is a perspective view of the disassembled apparatus with the essential parts labeled.
Figure 2:
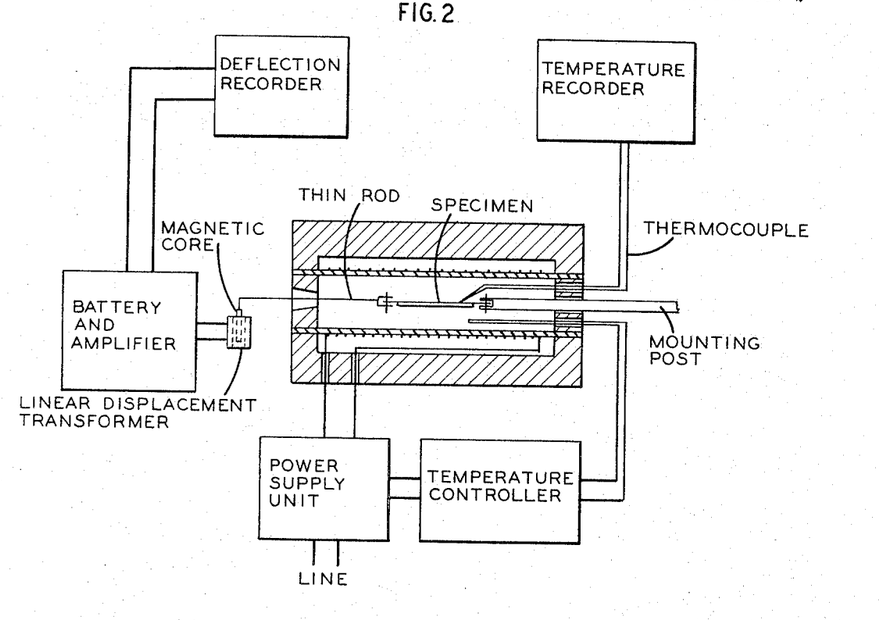
FIG. 2 is a view, partly diagrammatic, and partly in section (a horizontal section of the furnace and the specimen therein) of the assembled apparatus.
Figure 3:
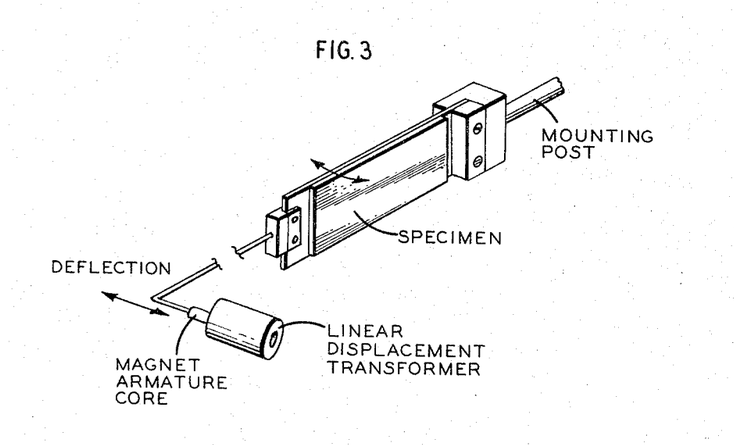
Figure 4:
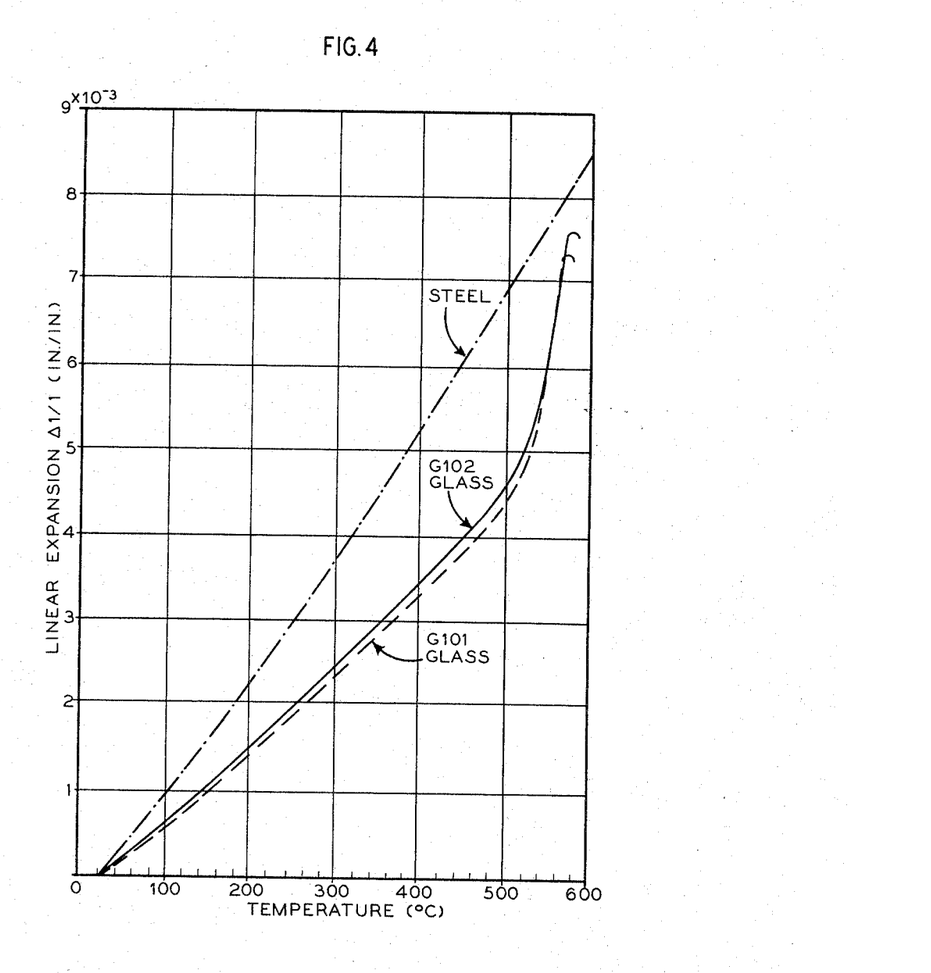
FIGS. 4 to 9 are reproductions of the thermal deflections of representative specimens of ceramic-metal systems tested in the apparatus.
Figure 5:
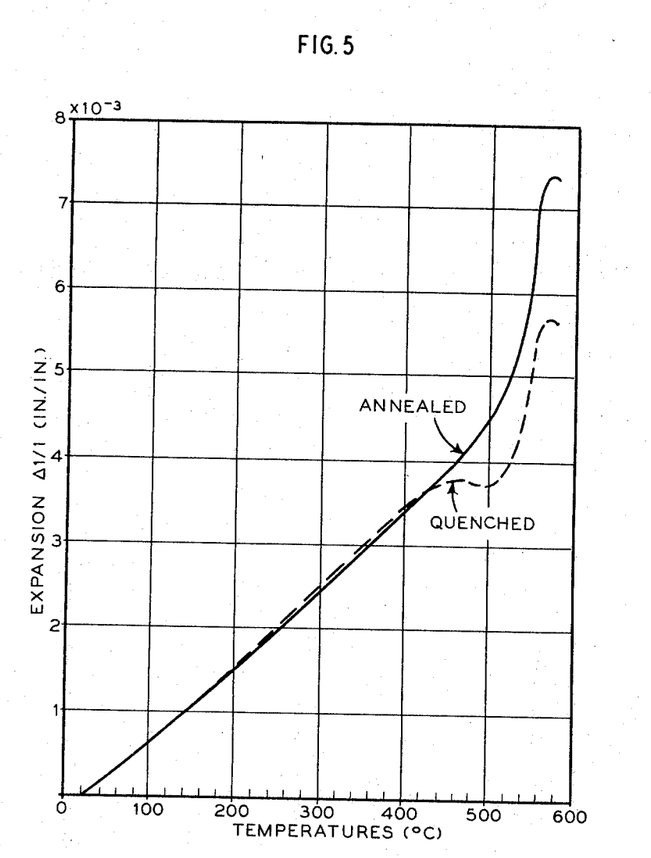

FIG. 4 shows the results of the measurement of the thermal expansion of the annealed glasses (G-101 and G-102) and the enameling steel. The average coefficient of thermal expansion of G-101 and G-102 glass and steel from 20 to 200° C. is $91 \times 10^{-7}$, $94 \times 10^{-7}$ and $125 \times 10^{-7}$ in./in./° C., respectively. The thermal expansion of annealed and quenched samples of G-101 glass are compared in FIG. 5. It is apparent that the quenched glass had a different thermal expansion behavior from that of annealed glass near the transformation range.

Figure 6:
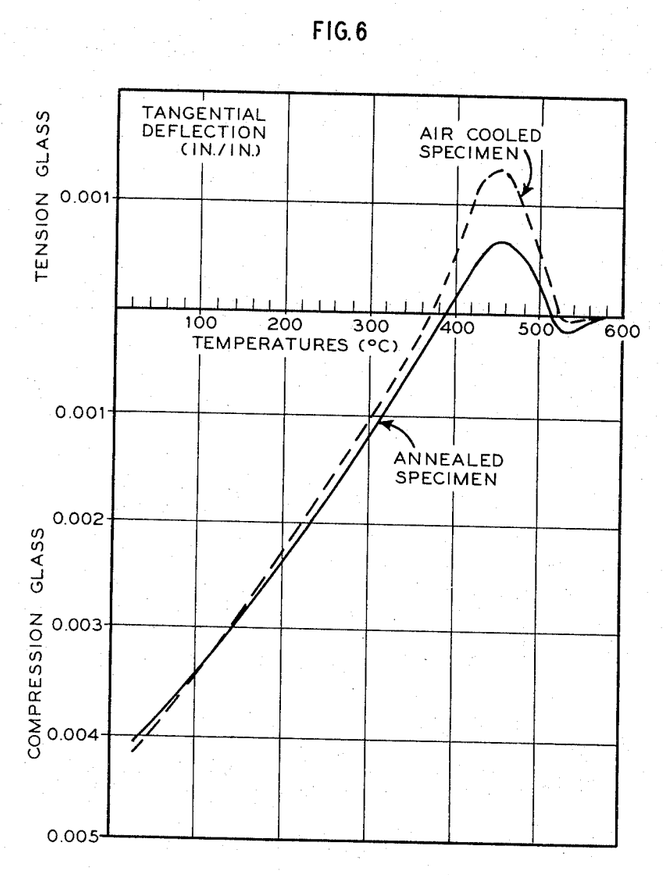

Since the thermal expansion of glass is affected by its thermal background, it is expected that a difference in thermal history of an enameled sample causes considerable differences in the amount of strain developed. An enameled specimen, air cooled from the enameling temperature, was heated at 5° C. per minute from room temperature to 620° C. while the deflection was measured. The same specimen was annealed by cooling in the furnace at about 5° C. per minute from 620° C. The annealed specimen was then subjected to the next run. The results are shown in FIG. 6. No further deflection was observed above 570° C., which was the softening temperature of the glass used, so that this line was considered as the no-strain line. The area above this represents tension and the area below, compression.

Figure 7:
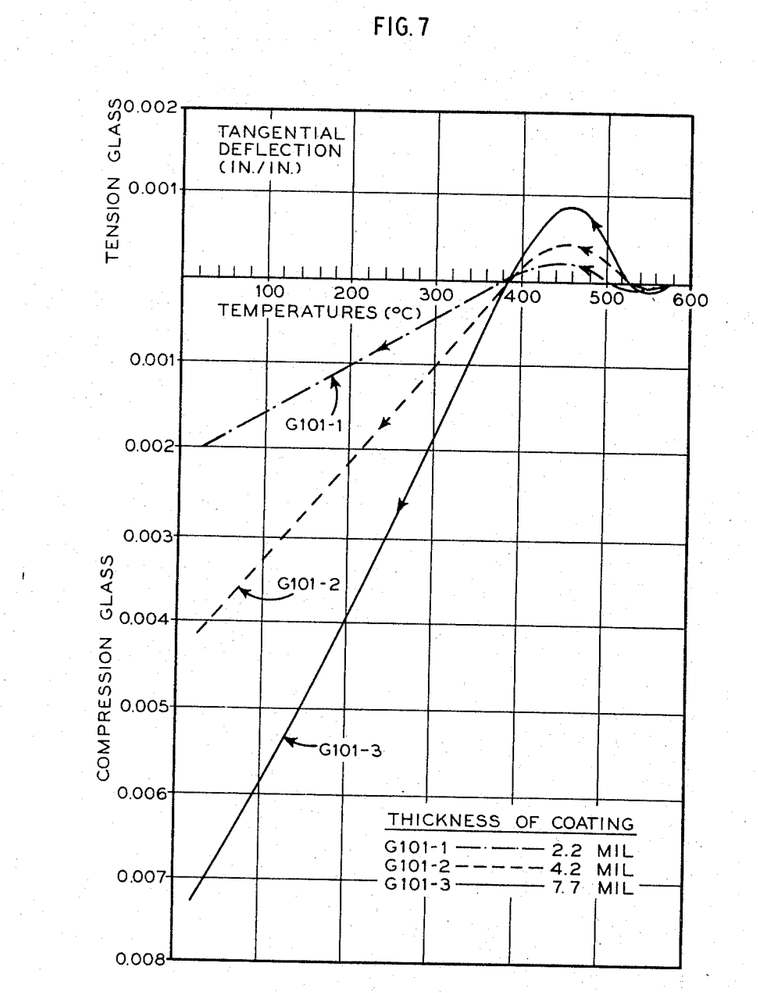
Figure 8:
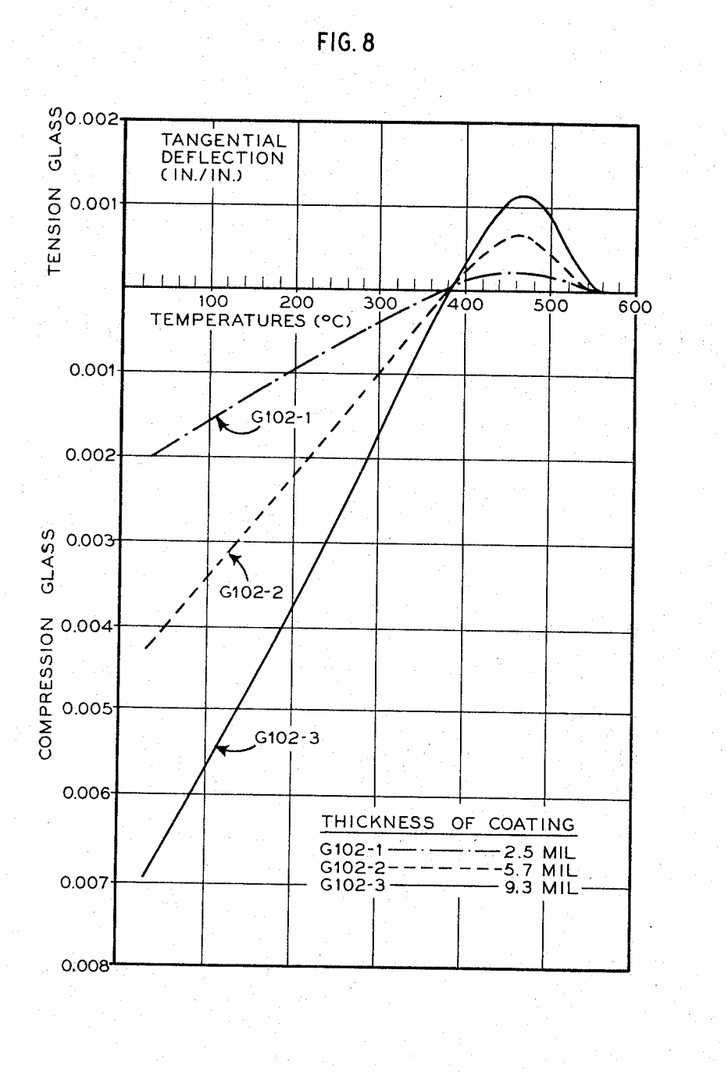

To show the effect of the thickness of the enamel on stress-strain the specimens were heated in the furnace to 620° C., which is about 50° C. above the softening temperature of the enamel, held for 10 minutes and then followed by cooling at 5° C. per minute to 300° C., below which the power was turned off and the specimens allowed to cool in the furnace. The deflection-temperature curves obtained during cooling are shown in FIG. 7 and FIG. 8. The coatings were in tension upon initial cooling from high temperature. After reaching a maximum tension at about 460° C., the amount of tension decreased continuously until the no-strain point was reached at about 380° C. Further cooling placed the coatings into compression. As shown in FIG. 7, the lower no-strain temperature was affected slightly by a difference in enamel thickness, while the amount of strain changed proportionally with enamel thickness.

Figure 9:
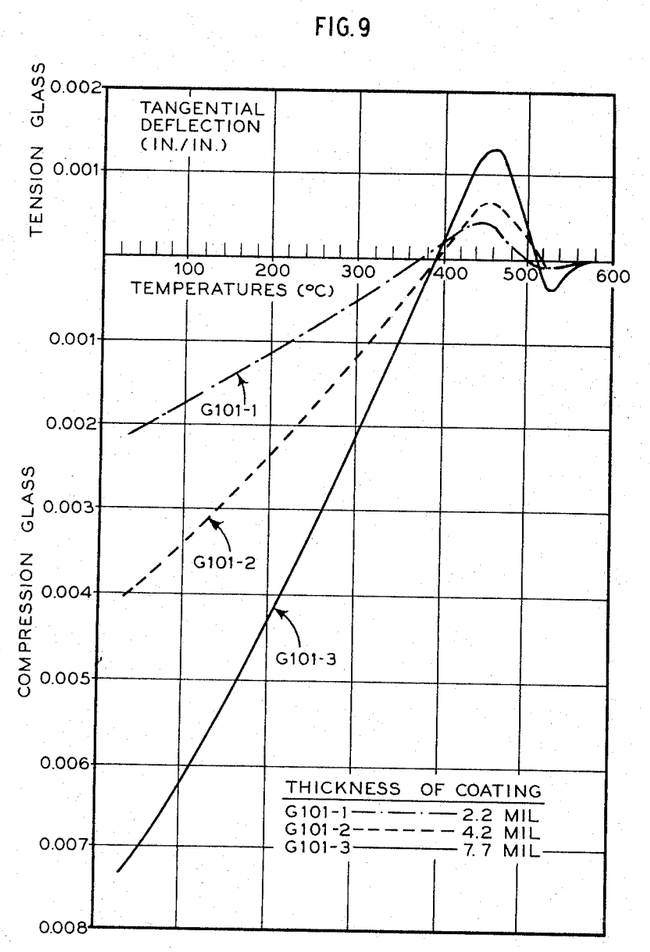

In order to observe how the strain changes upon heating, the same specimens were subjected to a heating cycle with a heating rate of 5° C. per minute. The deflection-temperature curves are shown in FIG. 9. A high tension was observed when the results are compared with those obtained by cooling. Before the coating reached no-strain at the upper no-strain temperature, it returned to compression again. This phenomenon has not been described in previous literature. It may be related to the stress relaxation process of glass in its transformation temperature range. Except for this, the results of the heating cycle are essentially the same as those for cooling.

From the foregoing it is apparent that a suitable apparatus for measuring the stress-strain of a ceramic-metal system such as a glass-metal system and giving information as to the prior history of the system has been devised.

While the apparatus of the invention has been shown in but one form, it will be obvious to those skilled in the art that it is not so limited but is susceptible of various changes and modifications without departing from the spirit thereof.

What is claimed is:

1. An apparatus for determining the stress-strain developed in a ceramic-metal system comprising in combination a furnace, a mounting post therein for supporting an elongate specimen representative of said ceramic-metal system within the furnace, one end of said specimen being fixed to said mounting post, an extension rod having one end attached to the free end of said specimen and extending axially therefrom through an opening in said furnace, a magnetic core attached to the outside end of the rod, extending therefrom at a right angle and interacting with a linear displacement transformer for measuring transverse displacement of said specimen, means for recording the measurement of the displacement, means for measuring and recording the temperature of the specimen, and means for controlling the temperature of the furnace.

2. An apparatus for determining the stress-strain developed in a glass-metal system comprising in combination a furnace, a mounting post therein for supporting an elongate specimen representative of said glass-metal system horizontally within the furnace, one end of said specimen being fixed to said mounting post, an extension rod having one end attached to the free end of said specimen and extending axially therefrom through an opening in said furnace, a magnetic core attached to the outside end of the rod, extending horizontally therefrom and at a right angle and interacting with a linear displacement transformer for measuring transverse displacement of said specimen, means for recording the measurement of the displacement, means for measuring and recording the temperature of the specimen, and means for recording the temperature of the furnace.

3. An apparatus for determining the stress-strain developed in a ceramic-metal system comprising in combination a furnace, a mounting post therein, said post being made of a high temperature low expansion alloy for supporting an elongate specimen representative of said ceramic-metal system within the furnace, one end of said specimen being fixed to said mounting post, an extension rod of a high temperature low expansion alloy, about $1/16''$ in diameter, having one end attached to the free end of said specimen and extending axially therefrom through an opening in said furnace, a magnetic core attached to the outside end of the rod, extending therefrom at a right angle and interacting with a linear displacement transformer for measuring transverse displacement of said specimen, means for recording the measurement of the displacement, means for measuring and recording the temperature of the specimen, and means for controlling the temperature of the furnace.

4. An apparatus for determining the stress-strain developed in a glass-metal system comprising in combination a furnace, a mounting post therein, said post being made of Invar for supporting an elongate specimen representative of said glass-metal system horizontally within the furnace, one end of said specimen being fixed to said mounting post, an extension rod of Invar, about $1/16''$ in diameter, having one end attached to the free end of said specimen and extending axially therefrom through an opening in said furnace, a magnetic core attached to the outside end of the rod and extending horizontally therefrom at a right angle and interacting with a linear displacement transformer for measuring transverse displacement of said specimen, an insulating block between the furnace and magnetic core, said insulating block having an opening through which the extension rod passes, means for recording the measurement of the displacement, means for measuring and recording the temperature of the specimen, and means for controlling the temperature of the furnace.

References Cited
UNITED STATES PATENTS

| | | | |
|---|---|---|---|
| 2,559,789 | 7/1951 | Peckham | 73—16 |
| 3,129,087 | 4/1964 | Hagy | 73—15.6 X |
| 3,271,996 | 9/1966 | Paulik et al. | 73—16 X |

RICHARD C. QUEISSER, *Primary Examiner.*

JAMES J. GILL, *Examiner.*

R. A. RUEHL, *Assistant Examiner.*